(12) United States Patent
Shinkai et al.

(10) Patent No.: US 9,617,957 B2
(45) Date of Patent: Apr. 11, 2017

(54) RESIN MOLDING MOLD FOR INTAKE MANIFOLD, INTAKE MANIFOLD AND METHOD OF RESIN MOLDING FOR INTAKE MANIFOLD

(71) Applicant: AISIN SEIKI KABUSHIKI KAISHA, Kariya-shi (JP)

(72) Inventors: Fumihiro Shinkai, Kariya (JP); Atsushi Ito, Kariya (JP); Futaba Kanehira, Kariya (JP); Tetsuo Shimizu, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 370 days.

(21) Appl. No.: 14/343,179

(22) PCT Filed: Oct. 26, 2012

(86) PCT No.: PCT/JP2012/077763
§ 371 (c)(1),
(2) Date: Mar. 6, 2014

(87) PCT Pub. No.: WO2013/069482
PCT Pub. Date: May 16, 2013

(65) Prior Publication Data
US 2014/0216386 A1    Aug. 7, 2014

(30) Foreign Application Priority Data
Nov. 10, 2011 (JP) ................................. 2011-246679

(51) Int. Cl.
B29C 45/44    (2006.01)
F02M 35/10   (2006.01)
(Continued)

(52) U.S. Cl.
CPC ... *F02M 35/10347* (2013.01); *B29C 45/2614* (2013.01); *B29C 45/4421* (2013.01);
(Continued)

(58) Field of Classification Search
CPC ............. B29C 45/2614; B29C 45/4421; B29L 2031/7492
See application file for complete search history.

(56) References Cited

U.S. PATENT DOCUMENTS 2,124,998 A  *  7/1938  Beckmann ............. B22D 15/02
                                                                   164/340
2,297,283 A  *  9/1942  Berg ........................ A47L 5/30
                                                                   15/412

(Continued)

FOREIGN PATENT DOCUMENTS

CN      101966737 A    2/2011
DE       3838921 A1    8/1989
(Continued)

OTHER PUBLICATIONS

Office Action (The First Office Action) issued on Jul. 3, 2015, by the State Intellectual Property Office of People's Republic of China in corresponding Chinese Patent Application No. 201280041731.X, and an English Translation of the Office Action. (16 pages).

(Continued)

*Primary Examiner* — Jill Heitbrink
(74) *Attorney, Agent, or Firm* — Buchanan Ingersoll & Rooney PC

(57) ABSTRACT

Provided are a resin molding mold enabling an intake manifold made of a resin to be manufactured at low cost, an intake manifold, and a method for molding a resin for an intake manifold. The resin molding mold for an intake manifold includes a slide mold provided at an end of a surge tank and a plurality of combination-type core molds molding
(Continued)

an inner surface of the surge tank. The core molds include a first core member capable of a relative movement in advance of another core member after resin molding, and a second core member capable of moving with utilizing an inner space formed by the relative movement of the first core member. The first core member and the second core member are configured to be extractable through a space inwardly of a resin-molded flange.

3 Claims, 7 Drawing Sheets

(51) Int. Cl.
  *B29C 45/26* (2006.01)
  *B29L 31/00* (2006.01)
  *F02M 35/112* (2006.01)
(52) U.S. Cl.
  CPC  *B29L 2031/7492* (2013.01); *F02M 35/10026* (2013.01); *F02M 35/112* (2013.01)

(56)  References Cited

U.S. PATENT DOCUMENTS

| | | | |
|---|---|---|---|
| 5,851,456 | A | 12/1998 | Mukawa et al. |
| 6,192,849 | B1 | 2/2001 | Powell |
| 6,286,471 | B1 | 9/2001 | Powell |
| 2006/0188601 | A1 | 8/2006 | Zydron |
| 2009/0152770 | A1 | 6/2009 | Mikac et al. |

FOREIGN PATENT DOCUMENTS

| | | | |
|---|---|---|---|
| EP | 1 195 513 A2 | | 4/2002 |
| JP | 33-184 | B1 | 1/1958 |
| JP | 47-12117 | B1 | 4/1972 |
| JP | 61-184858 | U | 11/1986 |
| JP | 4-341834 | A | 11/1992 |
| JP | 7-100856 | A | 4/1995 |
| JP | 7-243359 | A | 9/1995 |
| JP | 8-11197 | A | 1/1996 |
| JP | 9-193175 | A | 7/1997 |
| JP | 10-068361 | A | 3/1998 |
| JP | 10-202685 | A | 8/1998 |
| JP | 11-166457 | A | 6/1999 |
| JP | 2001-129860 | A | 5/2001 |
| JP | 2002-052581 | A | 2/2002 |
| JP | 2005-271269 | A | 10/2005 |
| JP | 2008-100525 | A | 5/2008 |

OTHER PUBLICATIONS

European Search Report issued on Jul. 29, 2014, by the European Patent Office in corresponding European Patent Application No. 12847062.2-1606. (7 pages).

International Search Report (PCT/ISA/210) mailed on Jan. 29, 2013, by the Japanese Patent Office as the International Searching Authority for International Application No. PCT/JP2012/077763.

Written Opinion (PCT/ISA/237) mailed on Jan. 29, 2013, by the Japanese Patent Office as the International Searching Authority for International Application No. PCT/JP2012/077763.

Notification of Transmittal of Translation of the International Preliminary Report on Patentability (Forms PCT/IB/338 and PCT/IB/373) and the Written Opinion of the International Searching Authority (Form PCT/ISA/237) issued on May 13, 2014, in the corresponding International Application No. PCT/JP2012/077763. (5 pages).

* cited by examiner

RESIN MOLDING MOLD FOR INTAKE MANIFOLD, INTAKE MANIFOLD AND METHOD OF RESIN MOLDING FOR INTAKE MANIFOLD

TECHNICAL FIELD

The present invention relates to a resin molding mold for an intake manifold made of a resin, an intake manifold obtained by the resin molding mold, and a method of resin molding for the intake manifold.

BACKGROUND ART

In recent years, weight reduction and cost reduction for various automobile parts have been implemented by forming these parts of a resin. Regarding an intake manifold for use in an automobile too, resin products have been the mainstream. Many of such intake manifolds made of a resin are fabricated by the vibration welding method (see Patent Document 1) comprising forming a flange at a rim of each one of a plurality of split members and joining these respective flanges by vibration welding.

As other methods for molding an intake manifold formed of a resin, there are such methods as the lost core injection molding method according to which a core having a low melting point is inserted into a mold and then this core is discharged therefrom by melting after resin molding process, a method according to which a hollow molded article is used as a core and a resin injection molding is effected on its outer side (see Patent Document 2, Patent Document 3).

CITATION LIST

Patent Literature

Patent Document 1: Japanese Unexamined Patent Application Publication No. Hei-10-68361
Patent Document 2: Japanese Unexamined Patent Application Publication No. 2005-271269
Patent Document 3: Japanese Unexamined Patent Application Publication No. Hei-7-100856

SUMMARY OF INVENTION

In the case of manufacturing a resin-made intake manifold by the vibration welding method shown in Patent Document 1, separately of the resin injection molding process of the split members, there is also required a step of vibration-welding the multiple split members, thus inviting manufacture cost increase. Moreover, regarding the lost core method, this method requires separately e.g. a device for melting the core. As for the method disclosed in Patent Document 2 and Patent Document 3 using a hollow molded article as a core, this method requires separately a device for manufacturing the hollow molded article. Hence, these further methods too lead to manufacture cost increase.

The present invention has been made in view of the above-described problems. Its object is to provide a resin molding mold enabling an intake manifold made of a resin to be manufactured at low cost, an intake manifold, and a method of resin molding for the intake manifold.

According to a first characterizing feature of a resin molding mold for an intake manifold relating to the present invention, a resin molding mold for an intake manifold comprises a surge tank, an annular flange provided at an end of the surge tank and having a smaller inside diameter than an inside diameter of the surge tank so as to attach a throttle body;

wherein the resin molding mold comprises a slide mold molding the flange and a plurality of combination-type core molds molding an inner surface of the surge tank;

wherein the core molds include a first core member capable of a relative movement in advance of another core member after resin molding, and a second core member capable of moving with utilizing an inner space formed by the relative movement of the first core member; and wherein the first core member and the second core member are configured to be extractable through a space inwardly of a resin-molded flange.

With the above-described arrangement, the resin molding mold allows extraction of the core mold through a space inwardly of a resin-molded flange provided for attachment of a throttle body. Namely, the space inwardly of the resin-molded flange is an opening required for connection of an intake pipe. However, with the resin molding mold having the above-described arrangement, the core mold can be extracted through this opening. Accordingly, unlike the convention, there arises no need for configuring the intake manifold in the form of the split type for allowing extraction of the core mold. As a result, the configuration of the intake manifold can be simplified, with e.g. possibility of omission of flange portions for frictional joint to be effected later. Moreover, the manufacturing process of an intake manifold can be simplified, with e.g. omission of a joining step which would otherwise be additionally required.

According to a second characterizing feature of a resin molding mold for an intake manifold relating to the present invention, the first core member is configured to be insertable to and withdrawable from the inner space formed by combining a plurality of the second core members with each other.

The core mold forms the inner surface of the surge tank having a greater inside diameter than the inside diameter of the flange. Thus, when the plurality of core members are joined together, the outside diameter of a portion corresponding to the flange as the core mold is smaller than the outside diameter of the portion forming the inner surface of the surge tank. Therefore, in case the first core member which is firstly moved after resin injection is the core forming the inner surface of the surge tank, e.g. when another second core member is to be withdrawn in such a manner as not to contact this inner surface, there is the possibility of the withdrawing direction of the second core member becoming complicated. On the other hand, with the inventive arrangement described above in which the first core member is configured to be insertable to and withdrawable from an inner space formed by combining a plurality of the second core members with each other, the shape of the first core member can be e.g. a simple cylindrical shape or angular cylindrical shape. In this case, by simply withdrawing this first core member located at the center, it becomes possible to form an inner space that allows easy extraction of the other second core member from the surge tank.

According to a third characterizing feature of a resin molding mold for an intake manifold relating to the present invention, in the first core member and the second core member, there are respectively formed an engaging portion and an engaged portion that come into engagement when the first core member comes into engagement with the second core members around it as the first core member is pressed in along a longitudinal direction of its own.

Normally, the shape of the surge tank requires a length extending over a plurality of cylinders. Therefore, the inner space of the surge tank is formed as an elongate space. And, the length of each one of the core members combined is necessarily large. In that case, there arises a need for causing the respective core members to be joined in a reliable manner so as not to form any gap due to influence of heat between adjacent core members at the time of resin injection.

With the core member having the above-described arrangement, the core members have an engaging portion and an engaged portion that restrict the first core member and the second core member relative to each other. Hence, it is possible to reliably form a cavity forming the surge tank portion during resin injection.

According to a fourth characterizing feature of a resin molding mold for an intake manifold relating to the present invention, a plurality of intake ports are formed continuously from the surge tank, and in the surface of the second core members, there is formed a funnel portion of a portion branching from the surge tank to the intake port.

With the above-described arrangement in which a funnel portion for the intake port is formed integral in the surface of the second core members, the inside face forming the transition from the surge tank to the intake port can be formed as a gapless smooth shape. Further, as the fine shape of the funnel continuous from the surge tank to the intake port can be formed in the surface of the core member which is relatively small and which has good flexibility, this forming process is made easy.

According to a fifth characterizing feature of a resin molding mold for an intake manifold relating to the present invention, in addition to the core mold forming the surge tank, the resin molding mold comprises a further core mold forming the intake port and contactable with the core mold, and a gate through which the resin forming the surge tank is injected is provided on a side of the core mold opposite the further core mold.

With the above-described arrangement in which a gate is provided on the side of the core mold opposite the further core mold forming the intake port, at the time of injection of resin for forming the surge tank portion, this resin can be used for pressing the core mold against the further core mold. As a result, it becomes possible to stabilize the posture of the core mold which is fixed in a cantilever manner, thus rending the shape of the surge tank stable and preventing e.g. bending deformation of the core mold through repeated use.

According to a characterizing feature of an intake manifold relating to the present invention, the intake manifold comprises a plurality of intake ports, a surge tank in which the intake ports are grouped and joined together, and an annular flange for body throttle attachment having a smaller inside diameter than an inside diameter of the surge tank, wherein a parting line is formed along a longitudinal direction of the surge tank between and across an inner surface of the flange and an inside surface of the surge tank.

The intake manifold according to the present invention is formed by withdrawing a plurality of core members through an inner space of the flange. As this core member forms a bulging portion inside the surge tank, for the withdrawal, a certain core member of the core members provided separately will be moved at first so as to secure a space which allows subsequent movement of another core member. In this way, the core members will be extracted or withdrawn one after another. That is, a join or seam between adjacently joined core members forms a parting line in the inner face of the finished intake manifold. Moreover, this parting line will have a unique shape as being formed continuously from the area of the surge tank to the inner face of the flange.

According to a further characterizing feature of an intake manifold relating to the present invention, the surge tank is molded integrally.

If the surge tank is molded integrally as provided in the above-described arrangement, unlike the convention, there arises no need for configuring the intake manifold in the form of the split type for allowing extraction of the core mold. As a result, the configuration of the intake manifold can be simplified, with e.g. possibility of omission of flange portions for frictional joint to be effected later. Moreover, with the possibility of omission of the flange portion, weight reduction of the intake manifold is made possible and air-tightness can be improved.

According to a further characterizing feature of an intake manifold relating to the present invention, in an inner face of an end of the surge tank perpendicular to the axis of the surge tank along the longitudinal direction, there are formed a polygonal or circular parting line formed by borders of the plurality of core members adjacently disposed as a molding mold and a parting line formed by borders of engaging portions provided in the plurality of core members and having a shape radially protruding and retracting about the axis.

The intake manifold according to the present invention is formed by withdrawing the plurality of core members through the inner space of the flange. The borders of the plurality of core members adjacently disposed form a polygonal or circular parting line in the inner face at the end of the surge tank perpendicular to the axis of the surge tank along the longitudinal direction. Further, the borders of the engaging portions provided in the plurality of core members together form a parting line having a shape radially protruding and retracting about the axis of the surge tank. With this, the parting line in the inner face at the end of the surge tank perpendicular to the axis of the surge tank along the longitudinal direction is provided with the unique shape.

According to a characterizing feature of a method of resin molding for an intake manifold relating to the present invention, in a method for molding a resin for an intake manifold including a surge tank, an annular flange provided at an end of the surge tank and having a smaller inside diameter than an inside diameter of the surge tank so as to attach a throttle body, the method comprises the steps of: forming a cavity for forming the surge tank by combining together a plurality of core members having a length extending from the flange to an end of the surge tank; disposing a slide mold in an annular form to form the flange in such a manner as to surround outer circumferences of the plurality of core members; injecting an amount of resin to inside of the cavity and to outside of the slide mold to form an intake manifold; and subsequently moving one of the plurality of core members relative to a further core member and moving the further core member with utilizing a space formed by relative movement, thereby to extract the plurality of core members through a space inwardly of the flange.

In the intake manifold, there is formed a flange portion for attachment of a throttle body, at which a hole portion is formed as an inward space for communication of air introduced. According to the present invention, through this inward space, the core members forming the surge tank located on the back side thereof are withdrawn. Moreover, the inside diameter of the surge tank is normally greater than the aperture diameter of the flange. That is, regarding the inside diameter of the surge tank, the inside diameter of the flange is to constitute a constricted portion for air communicated. So, the aperture diameter of the flange portion needs to be small. With the inventive method described above; however, unlike the convention, there is no need to configure the intake manifold in the split type to allow withdrawal of core members after resin injection. Therefore, the configuration of the manifold is simplified and the manufacturing steps can be reduced significantly also.

DESCRIPTION OF EMBODIMENTS

Next, embodiments of a resin molding mold for an intake manifold and an intake manifold both relating to the present invention will be described with reference to the accompanying drawings.

Figure 1:
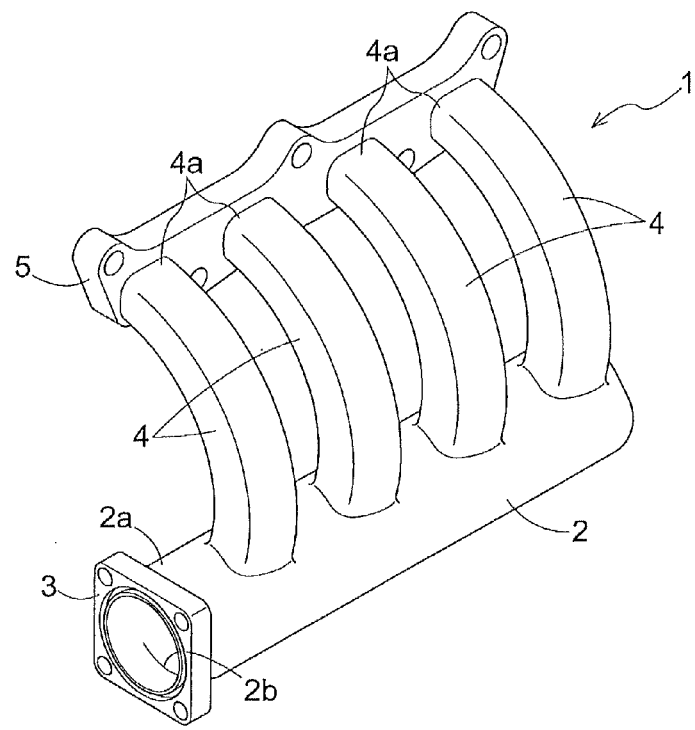
FIG. 1 is a perspective view of an intake manifold.
Figure 2:
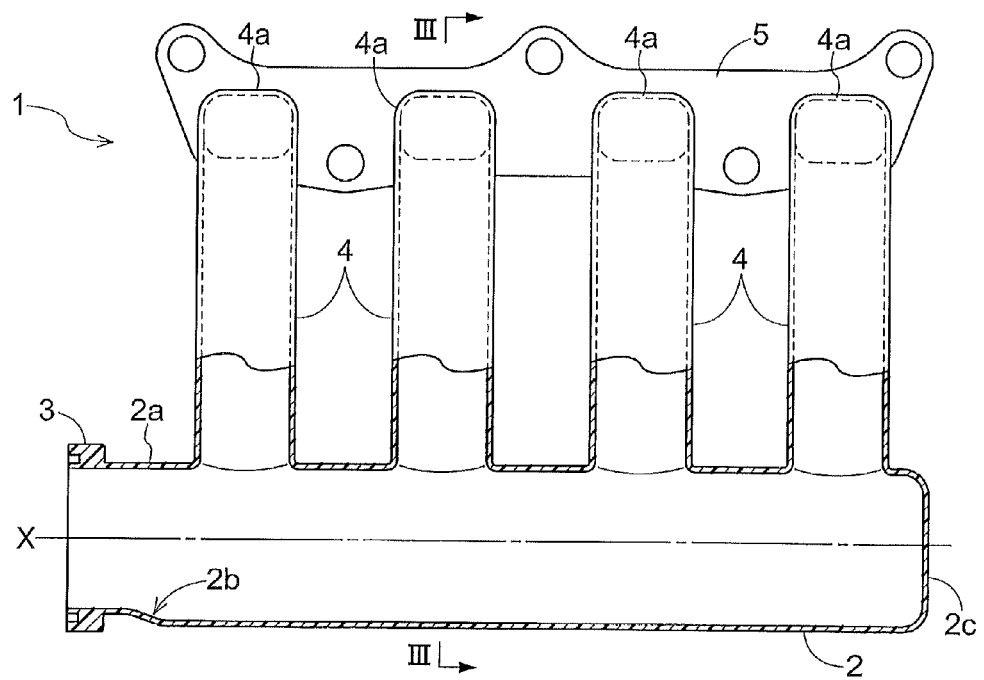
FIG. 2 is a vertical section of the intake manifold.
Figure 3:
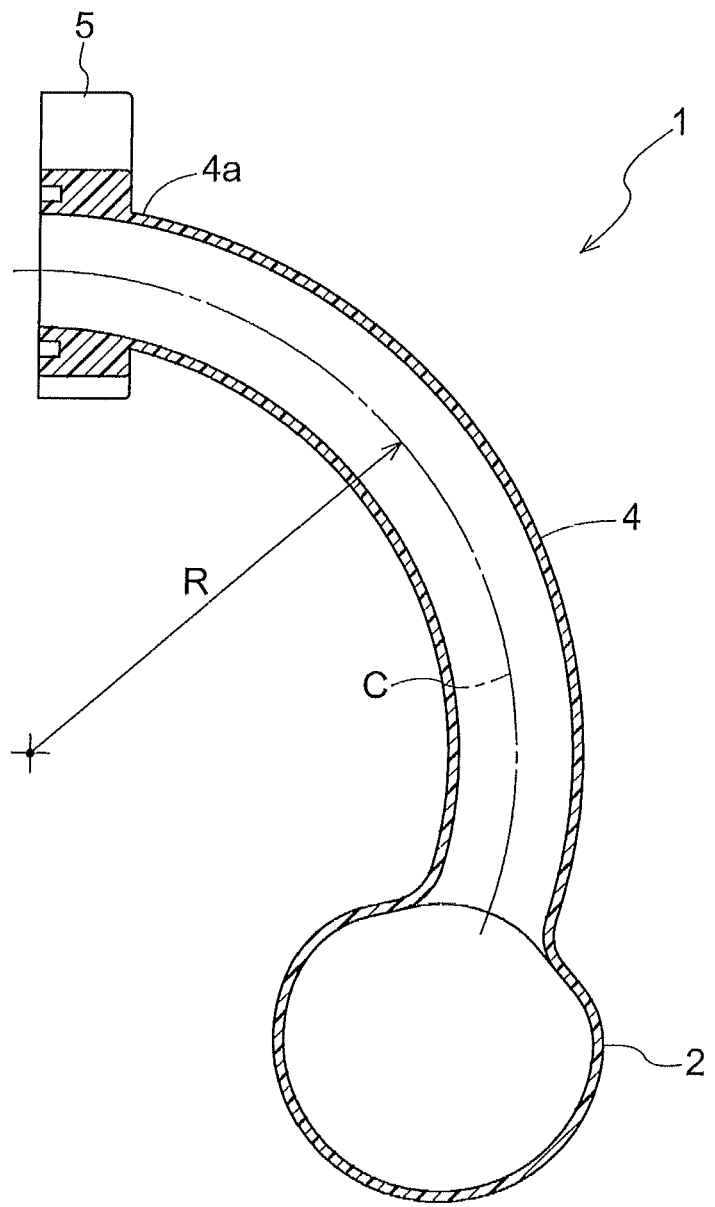
FIG. 3 is a view taken along arrows III-III in FIG. 2.

An intake manifold 1 shown in FIGS. 1-3 is manufactured by resin-molding on the outer side of a resin molding mold constituted of a plurality of core molds and subsequently extracting/withdrawing the resin molding mold. The intake manifold 1 includes a surge tank 2, and an annular flange 3 provided at an end 2a of the surge tank 2 and having an inside diameter smaller than an inside diameter of the surge tank 2 for mounting a throttle body (not shown) therein. The surge tank 2 has a cylindrical shape having an axis X and to the upper face of the surge tank 2, a plurality of intake ports 4 are connected continuously. At ends 4a of the intake ports 4, there is provided a flange 5 which is to be attached to a cylinder head (not shown) of an internal combustion engine.

As described above, the surge tank 2 of the intake manifold 1 is molded integrally. For this reason, unlike the convention, there is no need to configure the intake manifold in the split construction allowing withdrawal of core molds. As a result, the configuration of the intake manifold can be simplified by e.g. possibility of omission of a flange portion for frictional joint to be effected later. Further, with the omission of the flange portion, it becomes possible to achieve weight reduction of the intake manifold and improvement of sealing performance.

As shown in FIG. 2, the inside diameter of the surge tank 2 is greater than the inside diameter of the flange 3 and an undercut 2b is present at the bottom of the surge tank 2. Further, as shown in FIG. 3, each intake port 4 is formed such that its centerline C is formed as an arc having a single radius R.

[Resin Molding Mold]

Figure 4:
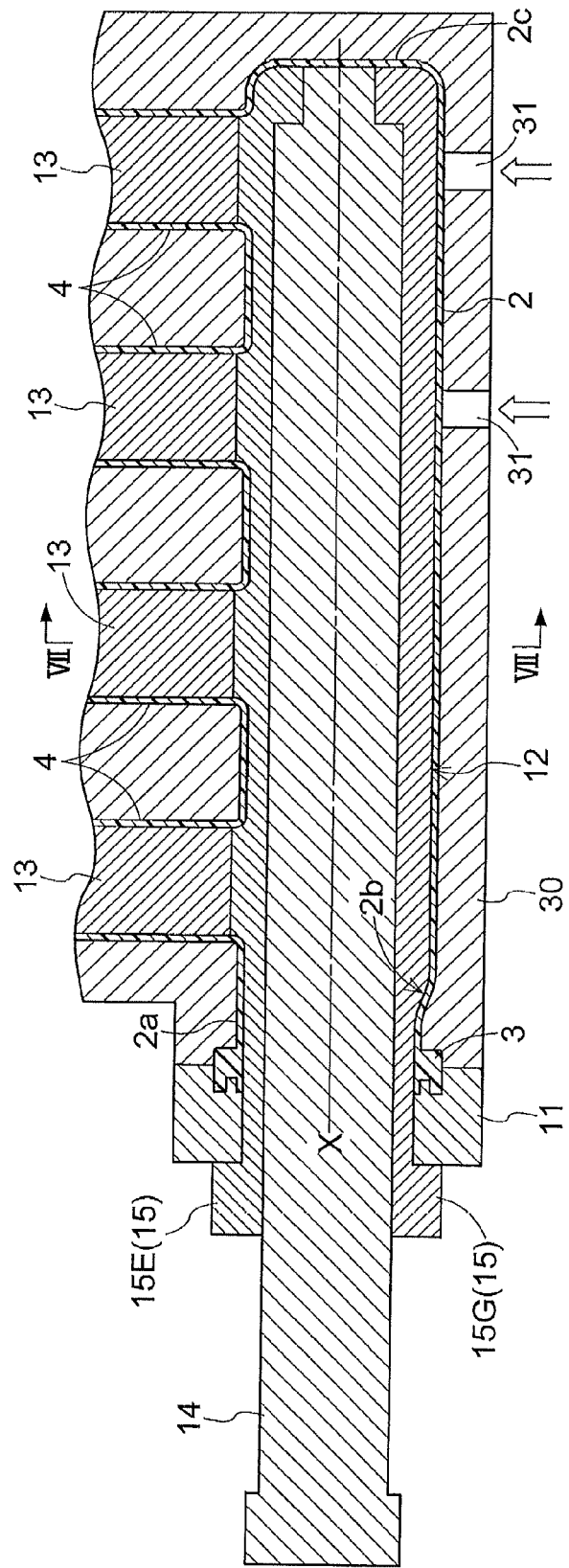
FIG. 4 is a partial section showing a resin injection molded state of a surge tank.
Figure 7:
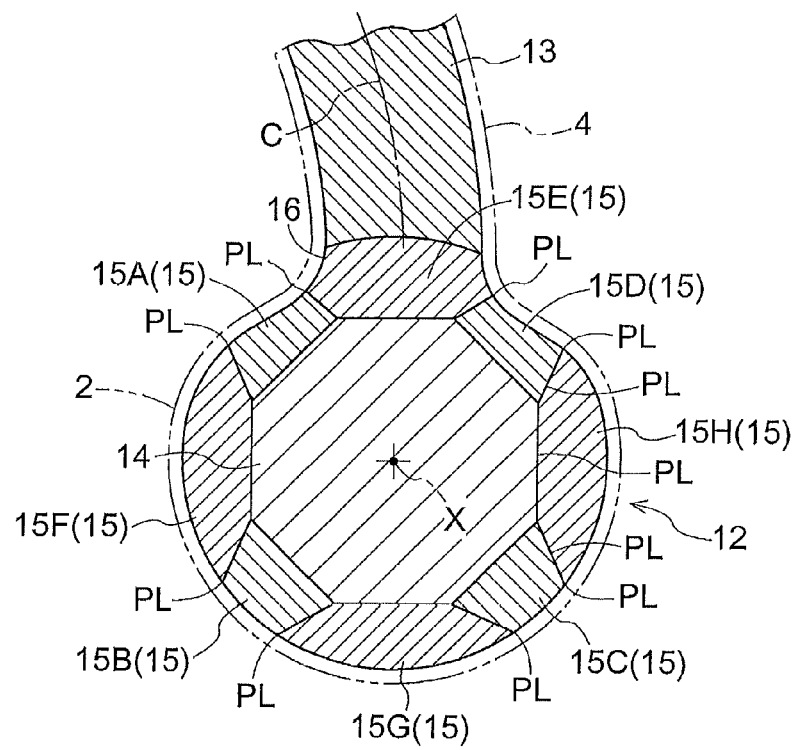
FIG. 7 is a view taken along arrows VII-VII in FIG. 4.

As shown in FIG. 4 and FIG. 7, a resin molding mold includes an annular slide mold 11 for molding the throttle-side flange 3, a plurality of combination-type core molds 12 for the tank configured to be inserted in the slide mold 11 and to form the inner face of the surge tank 2, and a core mold 12 for the intake ports forming the inner faces of the intake ports 4. Incidentally, the slide mold 11 can be composed of a combination of two semi-arcuate members, for example.

The tank core molds 12 are comprised of a plurality of core members, including a first core member 14 capable of a relative movement in advance of another core member after resin molding, and a second core member 15 capable of moving with utilizing an inner space V1 formed by the relative movement of the first core member 14. The first core member 14 is configured to be insertable to and extractable through the space V1 formed by combing the multiple second core members 15 to each other.

As shown in FIG. 7, for instance, the first core member 14 is disposed at the center, thus forming an octagonal cross section and eight second core members 15 configured as split molds are disposed around the outer circumference of the first core member 14. Regarding the second core members 15, split molds 15A-15D having a trapezoidal cross section and split molds 15E-15H having a narrow elongate hexagonal cross section are arranged in alternation, so that the first core member 14 and the second core members 15 together form the cylindrical tank core mold 12. Incidentally, the inner space V1 formed by combining the plurality of second core members 15 to each other may be provided in a cylindrical shape and the cross section of the first core member 14 may be cylindrical.

On the surface of the split mold 15E of the second core member 15, there is formed a funnel portion 16 at the portion of branching from the surge tank 2 to the intake port 4. In this way, as the funnel portion 16 for the intake port 4 is formed integrally on the surface of the second core member 15, the inner face forming the transition from the surge tank 2 to the intake port 4 can be formed with a seamless smooth shape. Further, since the complicated and fine shape of the funnel portion 16 continuous from the surge tank 2 to the intake port 4 can be realized on the surface of the second core member 15 which is relatively small and which has good flexibility, the shaping can be realized easily.

An intake-port core mold 13 is configured as a slide mold that can be withdrawn from the intake port 4 when this mold 13 is rotated along the centerline C (see FIG. 3) inside the intake port 4.

[Method of Resin Molding]

Next, a method of resin molding the intake manifold 1 utilizing the above-described resin-molding mold will be explained. As shown in FIG. 4, the cylindrical tank core mold 12 comprised of assembly of the first core member 14 and the second core members 15 is inserted to and disposed inside a mold 30 configured as a split type for molding the outer face of the molded article. Then, after fastening the mold, an amount of resin material is injected into a cavity between the mold 30 and the tank core mold 12. Advantageously, a gate 31 for the resin injection is provided at a position where the tank core mold 12 can be pressed on the opposite side. For instance, as shown in FIG. 4, the resin injection gate 31 will be provided at the position where the undercut 2b is formed and the tank core mold 12 will be brought into abutment against the intake core mold 13. With this, it is possible to carry out the injection molding operation with keeping the position of the tank core mold 12 stable, whereby the molded article (intake manifold) 1 shown in FIG. 1 can be molded in a reliable manner.

Figure 5:
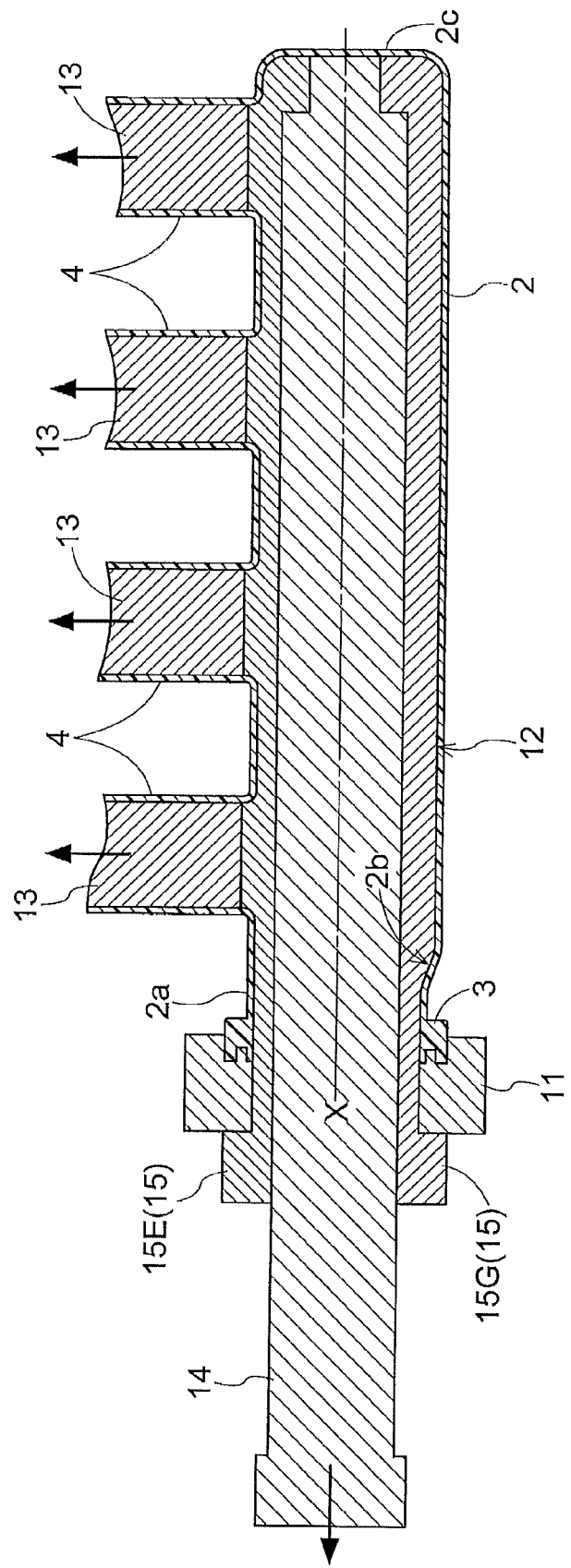
FIG. 5 is a partial section showing a molded article removed from a mold.

Next, the mold 30 molding the outer face of the molded article 1 is opened and the mold 30 is removed from the outer face of the molded article 1. Then, the process moves onto withdrawing operations of the core molds 12, 13 (see FIG. 5, FIG. 6).

Of the core molds 12, 13, firstly, the intake port core mold 13 is drawn out of the intake port 4. In this, since the intake port 4 is configured such that the centerline C in the inner space thereof is formed in the form of single radius R, the intake port core mold 13 will be pulled out along this centerline C (see FIG. 3).

Next, the tank core mold 12 is extracted from the surge tank 2. Of the tank core mold 12, the first core member 14 located at the center will be removed from an opening (inward space) V2 of the throttle-side flange 3, by a relative movement along the direction of the axis X, in advance of the other core member 15. Incidentally, the intake port core mold 13 and the first core member 14 may be extracted together at one time from the molded article 1.

Figure 6:
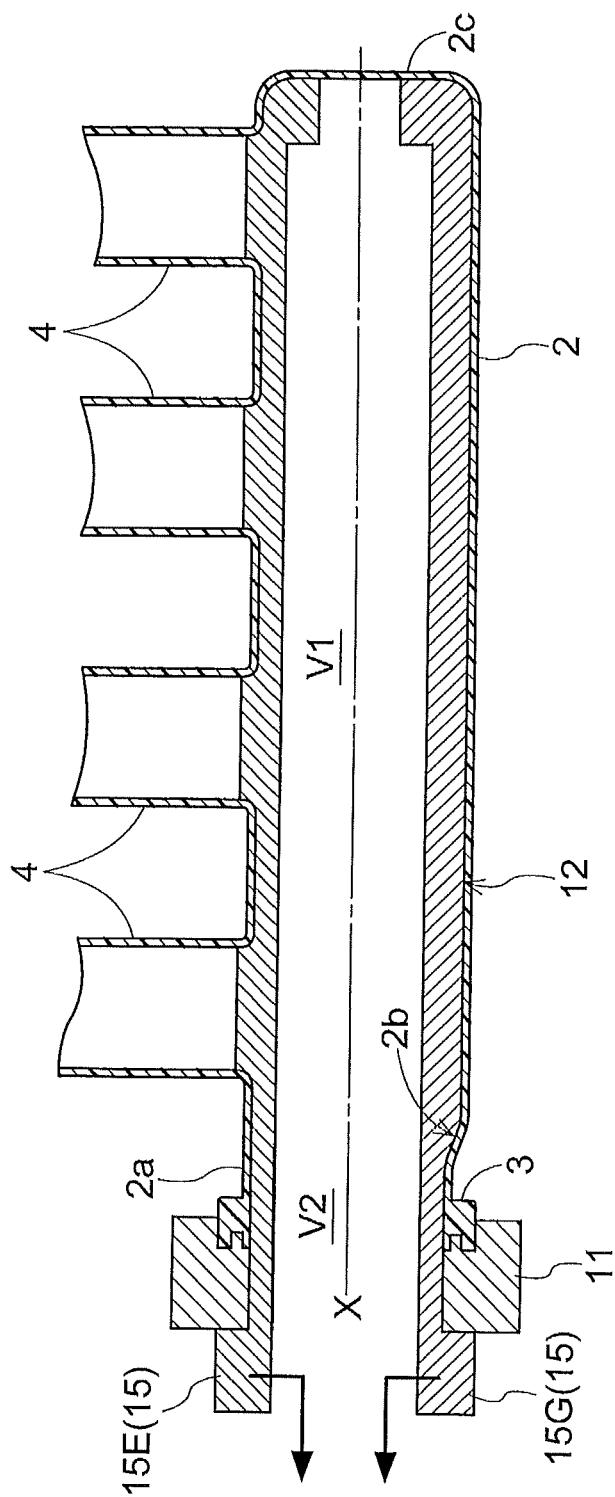
FIG. 6 is a partial section showing a state where a first core member has been extracted from the molded article.

Thereafter, the second core members 15 disposed around the first core member 14 will be pulled out of the surge tank 2. As shown in FIG. 6, the second core members 15 will be pulled out of the tank 2 with utilizing the inner space V1 formed as the result of the relative movement of the first core member 14. For instance, the pull-out operation will be effected with firstly moving the split molds 15A, 15B, 15C, 15D of the second core members 15 temporarily into the inner space V1 inside the surge tank 2 and then moving them along the longitudinal direction (the direction of the axis X) of the surge tank 2. Then, the pull-out operation will be effected with moving the remaining split molds 15E, 15F, 15G, 15H temporarily into the inner space V1 inside the surge tank 2 and then moving them along the longitudinal direction (the direction of the axis X) of the surge tank 2 to be pulled out of the opening (inward space) V2 of the flange 3. The second core members 15 may be pulled out one by one from the surge tank 2 or may be pulled out all together therefrom.

Lastly, the slide mold 11 will be pulled out of the throttle-side flange 3, thus completing resin molding of the surge tank 2 and the throttle-side flange 3 of the intake manifold 1.

In this way, the molded intake manifold 1 is formed by pulling out the multiple core members (the first core member 14, the second core members 15) through the space V2 inwardly of the flange 3. As the core members 14, 15 form bulging portions inside the surge tank 2, for their removal, of the core members 14, 15 separately provided, the first core member 14 disposed at the center will be firstly moved. This forms a space that allows subsequent movement of the second core members 15, so these second core members 15 will be pulled out one after another. That is, the join between the second core members 15 adjacently assembled along the outer circumference of the first core member 14 will form a parting line PL in the inner face of the finished intake manifold 1. Moreover, this parting line PL extends continuously from the area of the surge tank 2 to the inner face of the throttle-side flange 3, thus presenting a unique shape.

Via the inward space V2 of the throttle-body attaching flange 3, the core molds can be extracted. That is, the inward space V2 of the flange 3 is an opening needed for joining an intake pipe. However, with the resin molding mold having the above-described configuration, via this space, the core molds (core members 14, 15) can be extracted. Therefore, unlike the convention, there is no need for configuring the intake manifold 1 in the split type for allowing extraction of the core molds. As a result, the configuration of the intake manifold 1 can be simplified, with e.g. possibility of omission of a flange portion for frictional joint to be effected later.

Moreover, the manufacturing process of the intake manifold 1 can be simplified, with e.g. omission of a joining step which would be required additionally.

The tank core mold 12 forms the inner face of the surge tank 2 having the inside diameter greater than the inside diameter of the throttle-side flange 3. Therefore, under the state of the multiple core members 14, 15 being assembled together, the outside diameter of the portion of the flange 3 as the core mold is smaller than the outside diameter of the portion forming the inner face of the surge tank 2. Thus, after resin injection, if the first core member 14 to be moved firstly is the core forming the inner face of the surge tank 2, when the other second core member 15 is to be extracted without coming into contact with this inner face, there is the possibility of the withdrawing direction of the second core member 15 becoming complicated. However, if the first core member 14 is configured to be insertable to and extractable from the inner space V1 formed by combing of the other second core members 15 as provided in the above-described arrangement, the shape of the first core member 14 can be e.g. a simple cylindrical or angular cylindrical shape. In this case, with simple pulling out of this first core member 14 at the center, it is possible to form the inner space V1 through which the other second core members 15 can be readily extracted from the surge tank 2.

Figure 8:
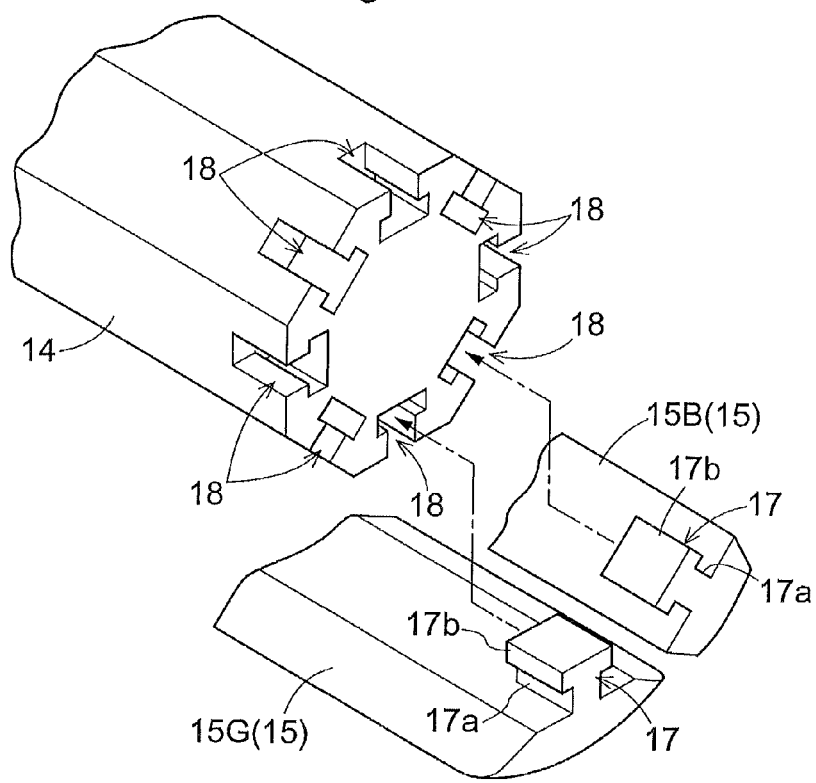
FIG. 8 is a view showing an engagement arrangement of core members.

As shown in FIG. 8, the first core member 14 and the second core member 15 respectively form engaged portions 18 and engaging portions 17 that come into engagement with each other for engaging these members 14, 15. The engaging portion 17 formed at a leading end of the second core member 15 includes a base portion 17a projecting relative to the first core member 14 and a slot portion 17b formed continuously from the base portion 17a, so that the engaging portion 17 as a whole presents a T-shape as seen in a cross section perpendicular to the longitudinal direction of the second core member 15. The engaged portion 18 formed at a leading end of the first core member 14 has a concave shape corresponding to the shape of the engaging portion 17 of the second core member 15. In operation, as the first core member 14 is pressed in along its own longitudinal direction, the engaged portion 18 of the first core member 14 comes into engagement with the engaging portion 17 of the second core member 15.

Normally, the shape of the surge tank 2 requires a length extending over a plurality of cylinders. Therefore, the inner space V1 of the surge tank 2 is formed as an elongate space. And, the length of each one of the core members 14, 15 combined is necessarily large. In that case, there arises a need for causing the respective core members 14, 15 to be joined in a reliable manner so as not to form any gap due to influence of heat between adjacent core members at the time of resin injection. With the core members 14, 15 having the above-described inventive arrangement, the first core member 14 and the second core member 15 have an engaged portion 18 and an engaging portion 17 that restrict the first core member 14 and the second core member 15 relative to each other. Hence, it is possible to reliably form a cavity forming the surge tank 2 during resin injection.

Also, the engaging portion 17 and the engaged portion 18 are formed respectively at the leading ends of the core members 15, 14. That is, in order to avoid loosening of the assembled/joined condition of the elongate core members 14, 15 joined together, the core members 14, 15 are restricted relative to each other at both ends, that is, at the flange 3 located at one end and the end opposite thereto. With this, it is possible to obtain a tank core mold 12 having high durability.

As shown in FIG. 7, the borders of the plurality of core members 14, 15 adjacently disposed form a polygonal (or circular) parting line PL in the inner face at the end 2c of the surge tank 2 perpendicular to the axis X of the surge tank 2 along the longitudinal direction. In the instant embodiment, at the end of the first core member 14 and the end of the second core member 15, there are provided the engaging portion 17 or the engaged portion 18. Therefore, in the inner face of the end 2c of the surge tank 2, further, the borders of the engagement portions (engaging portions 17, engaged portions 18) together form a parting line having a shape radially protruding and retracting about the axis X of the surge tank 2 (see FIG. 8). With this, the parting line PL in the inner face at the end 2c of the surge tank 2 perpendicular to the axis X of the surge tank 2 along the longitudinal direction is provided with the unique shape.

With respect to the position of the tank core mold 12, the gate 31 for resin injection is provided on the opposite side to the further core mold 13 forming the intake port 4, at the time of injection of resin for forming the surge tank 2, this resin can be used for pressing the tank core mold 12 against the further core mold 13. As a result, it becomes possible to stabilize the posture of the tank core mold 12 which is fixed in a cantilever manner, thus rending the shape of the surge tank 2 stable and preventing e.g. bending deformation of the tank core mold 12 through repeated use.

Second Embodiment

Figure 9:
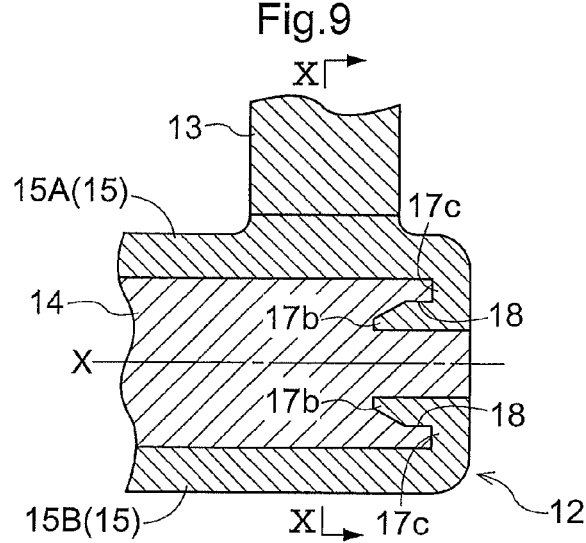
FIG. 9 is a section of core members according to a further embodiment.
Figure 10:
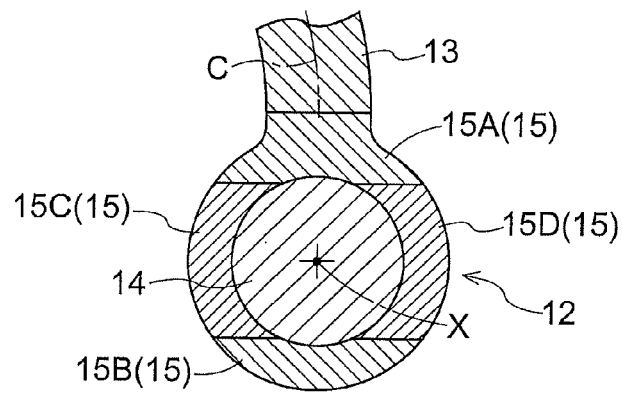
FIG. 10 is a view taken along arrows X-X in FIG. 9.
Figure 11:
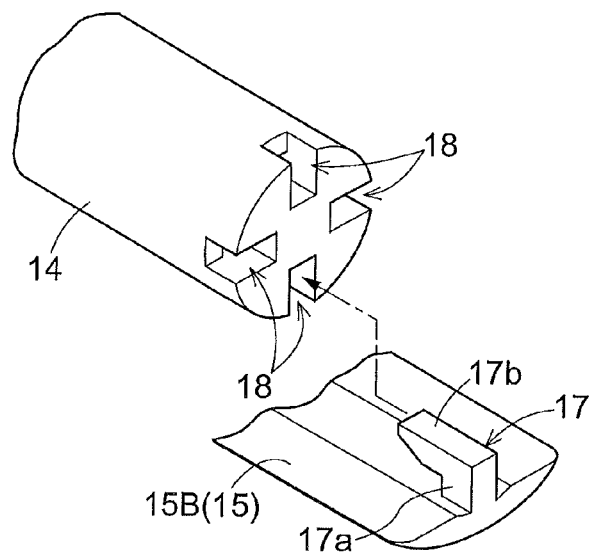
FIG. 11 is a view showing an engagement arrangement of the core members according to the further embodiment.

As shown in FIGS. 9-11, a resin molding mold according to this embodiment includes four second core members 15 at positions in the outer circumference of the first core member 14. The second core members 15 include split molds 15A, 15B provided at positions in opposition to each other across the circumferential face of the first core member 14 in the longitudinal direction and having semi-circular cross section, and split molds 15C, 15D provided at positions adjacent the split molds 15A, 15B and having arcuate cross section.

In the case of the resin molding mold of this embodiment, after resin molding, of the tank core mold 12, the first core member 14 disposed at the center is extracted through the opening (inward space) V2 of the throttle-side flange 3, in advance of the other core member 15 by a relative movement of the first core member 14 along the direction of the axis X. Thereafter, of the second core members 15, the slit molds 15C, 15D are moved temporarily into the inner space V1 inside the surge tank 2 and then extracted by being moved along the longitudinal direction (the direction of the axis X) of the surge tank 2. Next, the remaining split molds 15A, 15B are moved temporarily into the inner space V1 inside the surge tank 2 and then extracted through the opening (inward space) V2 of the flange 3 by being moved along the longitudinal direction (the direction of the axis X) of the surge tank 2.

At the leading end of the first core member 14 and at the leading end of the second core member 15, there are respectively formed the engaged portion 18 and the engaging portion 17 which serve to engage these members with each other. The engaging portion 17 formed at the leading end of the second core member 15 includes a base portion 17a formed in this second core member 15 and protruding relative to the first core member 14 along the longitudinal direction and a tapered hook-like portion 17b folded from the base portion 17a toward the flange 3. The engaged portion 18 formed at the leading end of the first core member 14 has a concave shape corresponding to the shape of the engaging portion 17 of the second core member 15. As the first core member 14 is pressed in along its own longitudinal direction relative to the second core member 15, the engaged portion 18 of the first core member 14 comes into engagement with the engaging portion 17 of the second core member 15.

Other Embodiments (1) In the foregoing embodiments, there were shown examples of resin molding mold for molding the surge tank 2, the flange 3, and the intake ports 4. Instead, the resin molding mold may be configured to mold the surge tank 2 and the flange 3 only.

(2) In the foregoing embodiments, there was shown a manufacturing process of an intake manifold in which the mold 30 is opened after resin molding to remove the molded article 1 from the mold and then, the intake port core mold 13, the first core member 14 and the second core members 15 are extracted from the molded article 1 one after another. Instead, the manufacturing process may be configured such that a step of extracting the first core member 14 and the second core member 15 one after another from the molded article 1 after resin molding, a subsequent step of opening the mold 30 for removing the molded article 1 from the mold and a step of extracting the intake port core mold 13 from the molded article 1 are effected at one time or sequentially.

(3) In the foregoing embodiments, there were shown examples wherein the second core members 15 are assembled along the entire outer circumference in the longitudinal direction of the first core member 14. However, as long as the possibility of relative movement of the first core member 14 in advance of the second core members 15 is secured, the second core members 15 may be assembled with a portion in the longitudinal direction of the first core member 14. Further, the shapes of the first core member 14 and the second core member 15 in the tank core mold 12 are not particularly limited. Any shapes may suffice as long as they allow combining of the first core member 14 and the second core members 15 to form the interior shape of the surge tank 2. Further, the number of split molds of the second core member 15 is also not limited. And, the first core member 14 may be configured as a hollow mold.

(4) In the foregoing embodiments, there were shown the examples in which the engaging portion 17 is formed in the second core member 15 and the engaged portion 18 is formed in the first core member 14. Instead, the engaging portion 17 may be formed in the first core member 14 and the engaged portion 18 may be formed in the second core member 15.

In the foregoing embodiments, there were shown the examples in which the engaging portion 17 and the engaged portion 18 are formed at the leading ends of the core members 14, 15. Instead, the engaging portion 17 and the engaged portion 18 may be formed at longitudinally intermediate portions of the core members 14, 15. Further, in the engaging portion 17 and the engaged portion 18 respectively, there may be set a tapered face along the longitudinal direction of the first core member 14. With provision of such tapered faces in the engaging portion 17 and the engaged portion 18, assembly and disassembly of the first core member 14 and the second core member 15 may be effected in a smooth manner.

The present invention may be applied widely to various kinds of hollow products made of resin.

The invention claimed is:

1. A resin molding mold for an intake manifold comprising a surge tank, an annular flange provided at an end of the surge tank and having a smaller inside diameter than an inside diameter of the surge tank so as to attach a throttle body;
   wherein the resin molding mold comprises a slide mold molding the flange and a plurality of combination-type core molds molding an inner surface of the surge tank;
   wherein the core molds include a first core member capable of a relative movement in advance of another core member after resin molding, and a second core member capable of moving with utilizing an inner space formed by the relative movement of the first core member;
   wherein the first core member and the second core member are configured to be extractable through a space inwardly of a resin-molded flange,
   wherein the first core member is configured to be insertable to and withdrawable from the inner space formed by combining a plurality of the second core members with each other,
   wherein a plurality of intake ports are formed continuously from the surge tank, and
   wherein, at respective portions branching from the surge tank to the intake ports, funnel portions project from a surface of respective second core members into respective intake ports, said funnel portions being integrally formed with the respective second core members.

2. The resin molding mold for an intake manifold according to claim 1, wherein in the first core member and the second core member, there are respectively formed an engaging portion and an engaged portion that come into engagement when the first core member comes into engagement with the second core members around it as the first core member is pressed in along a longitudinal direction of its own.

3. The resin molding mold for an intake manifold according to claim 1, in addition to the core mold forming the surge tank, the resin molding mold comprises a further core mold forming the intake port and contactable with the core mold; and
   a gate through which the resin forming the surge tank is injected is provided on a side of the core mold opposite the further core mold.

* * * * *